(12) United States Patent  (10) Patent No.: US 6,231,101 B1
Kamida et al.  (45) Date of Patent: May 15, 2001

(54) SEAT STORAGE STRUCTURE FOR A PASSENGER CAR

(75) Inventors: Koji Kamida; Takahiro Mori, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/299,658

(22) Filed: Apr. 27, 1999

(30) Foreign Application Priority Data

Apr. 28, 1998 (JP) .................................................. 10-119743

(51) Int. Cl.$^7$ ....................................................... B60N 2/02
(52) U.S. Cl. ..................... 296/63; 296/65.05; 296/65.09; 296/65.03; 297/14; 297/331
(58) Field of Search ............................. 296/65.05, 65.09, 296/65.03, 63; 297/14, 15, 331, 335

(56) References Cited

U.S. PATENT DOCUMENTS

| | | | | |
|---|---|---|---|---|
| 3,227,488 | * | 1/1966 | Kosbab et al. | 296/66 |
| 3,246,924 | * | 4/1966 | Krueger et al. | 296/66 |
| 3,334,941 | * | 8/1967 | Krasinski et al. | 296/66 |
| 3,365,231 | * | 1/1968 | Burtt | 296/65 |
| 3,669,488 | * | 6/1972 | Derrickson, Jr. et al. | 296/66 |
| 5,195,795 | * | 3/1993 | Cannera et al. | 296/65.09 |
| 5,238,284 | * | 8/1993 | Whitaker | 296/37.16 |
| 5,240,302 | * | 8/1993 | Yoshida et al. | 297/15 |
| 5,269,581 | * | 12/1993 | Odagaki et al. | 296/65.09 |
| 5,482,349 | * | 1/1996 | Richter et al. | 296/65.09 |
| 5,492,386 | * | 2/1996 | Callum | 296/65.09 |
| 5,558,386 | * | 9/1996 | Tilly et al. | 296/65.1 |
| 5,570,931 | * | 11/1996 | Kargilis et al. | 296/65.09 |
| 5,681,077 | * | 10/1997 | Hasimoto | 297/15 |
| 5,711,505 | * | 1/1998 | Nemoto | 297/331 |
| 5,839,773 | * | 11/1998 | Ban et al. | 296/65.09 |
| 5,865,335 | * | 2/1999 | Farrell et al. | 220/270 |
| 5,868,451 | * | 2/1999 | Uno et al. | 296/65.05 |
| 5,902,953 | * | 5/1999 | Lenko et al. | 102/260 |
| 5,979,964 | * | 1/1999 | Ban et al. | 297/15 |
| 6,025,786 | * | 2/2000 | Rayford | 340/825.31 |
| 6,047,433 | * | 4/2000 | Chang | 15/222 |
| 6,070,939 | * | 6/2000 | Matsuo et al. | 297/335 |
| 6,085,375 | * | 7/2000 | Holm | 14/71.7 |

FOREIGN PATENT DOCUMENTS 9-99762  4/1997  (JP) .................................. B60N/2/30

* cited by examiner

Primary Examiner—Joseph D. Pape
Assistant Examiner—Kiran B. Patel
(74) Attorney, Agent, or Firm—Sughrue, Mion, Zinn, Macpeak & Seas, PLLC

(57) ABSTRACT

An operator opens the tail gate, and stretches his/her arm through the tail gate to make the seat back fall down forward. Then, the operator can pull the pull fitting to make both the seat back and the seat cushion turn over backward so as to be received in the storage concave portion. Accordingly, this design allows an operator to perform the rear seat rearrangement in a very easy posture from the outside of a car.

16 Claims, 10 Drawing Sheets

SEAT STORAGE STRUCTURE FOR A PASSENGER CAR

BACKGROUND OF THE INVENTION

1. Field of the Invention

The present invention relates to a rear seat storage structure.

The present application is based on Japanese Patent Application No. Hei. 10-119743, which is incorporated herein by reference.

2. Description of the Related Art

FIG. 10 is a view showing a related-art seat arrangement of a passenger car. In the drawing, a passenger car 100 is provided with a front seat 101, a middle seat 102, and a rear seat 103 as a third seat.

Of the passenger cars of this type, those which are designed so that the rear seat 103 can be received in a floor 104 in order to secure a rear luggage room are the main current. The rearrangement at that time will be described below.

FIGS. 11A and 11B are drawings for explaining the related-art rear seat storage.

FIG. 11A: Make a seat back 106 fall down forward. This operation is performed in the car room.

FIG. 11B: Make the seat back 106 turn by approximately 270 degrees together with a seat cushion 107 so as to be received in a storage concave portion 108. This turning operation is also performed in the car room. The main reason why the rearrangement is performed in the car is as follows. Firstly, if the seat back 106 is folded down forward, the top end of the seat back 106 comes close to the center of the room to make the operation from the outside of the car difficult. Secondly, in a related-art passenger car, a reclining mechanism and a seat lock mechanism for locking the seat cushion to the floor are designed to be unlocked from inside the car.

As described above, the rearrangement operation is performed mainly from inside the car. However, this tends to be difficult because of the limit in height (room height) so that a person is required to perform the operation at a stoop.

SUMMARY OF THE INVENTION

It is therefore an object of the present invention to provide a seat storage structure in which the rear seat rearrangement operation can be performed more easily.

In order to achieve the above object, there is provided a seat storage structure for a passenger car according to the present invention. In the car, a tail gate is provided in a rear portion thereof and a rear seat having a seat cushion and a seat back is disposed adjacent to the tail gate. The seat storage structure comprises a storage concave portion formed in a floor of the car and behind the rear seat, wherein the seat back is folded onto the seat cushion, the rear seat is rotated backward and received in the storage concave portion to make a bottom of the seat cushion substantially even with the floor. And the seat storage structure further comprises a pull fitting being provided in a back of the seat back for pulling the rear seat backward while the seat back is folded onto the seat cushion side, thereby receiving the rear seat in the storage concave portion.

An operator opens the tail gate, and stretches his/her arm through the tail gate to make the seat back fall down forward. Then, the operator pulls the pull fitting to make both the seat back and the seat cushion turn over backward so as to be received in the storage concave portion. This design allows an operator to perform the rear seat rearrangement in a very easy posture from the outside of a car.

Preferably, a lock member for locking the pull fitting not in use is provided in the back of the rear seat.

The pull fitting is fastened to the back of the seat back. This makes it possible to prevent the swinging of the pull fitting, etc.

In one embodiment of the above seat storage structure, a first bracket is fixed to a skeleton frame provided in the seat back, a second bracket attached to a base of the pull fitting is attached to the first bracket, a skin of the back seat is held between a receiving member and a garnish in a manner so that the receiving member and the garnish are put on the skin from a back and a front of the skin to cover an opening formed in the skin. A base of the pull fitting is disposed to face the garnish and the receiving member, and the receiving member is made to abut against the second bracket.

Thus, since the skin is held between the receiving member and the garnish, the opening of the skin is prevented from being deformed. In addition, since the receiving member is made to abut against the second bracket, the receiving member prevented from displacing laterally and the receiving member and the garnish are prevented from rattling.

Preferably, a first unlocking lever for unlocking a reclining mechanism is provided on the back surface of the seat back.

Since the first unlocking lever is provided in the back of the seat back, the reclining mechanism can be unlocked from the tail gate side. Therefore, by the operations of the first unlocking lever together with the pull fitting of claim 1, the rear seat rearrangement can be performed easily from the outside of the car.

In one embodiment of the above seat storage structure, a third bracket for swingably supporting the first unlocking lever is fixed to a skeleton frame provided in the seat back, a receiving having an opening is extended from the third bracket to a vicinity of a skin of the seat back so that the opening of the receiving member is made coincident with an opening formed in the skin, and a garnish is inserted in the opening of the receiving member so as to press the opening of the skin so that the skin is held between the garnish and the receiving member.

Since the skin is held between the receiving member and the garnish, the opening of the skin is prevented from being deformed. In addition, since the third bracket supporting the first unlocking lever is fixed to the skeleton frame, a large force can be applied to the first unlocking lever.

Preferably, a second unlocking lever for unlocking a seat lock mechanism which locks the seat cushion to the floor is provided in a rear portion of the seat cushion.

Since the second unlocking lever is provided in a rear portion of the seat cushion, the seat locking mechanism can be unlocked from the tail gate side. Therefore, by the operations of the first unlocking lever together with the pull fitting of claim 1, the rear seat rearrangement can be performed easily from the outside of the car.

Features and advantages of the invention will be evident from the following detailed description of the preferred embodiments described in conjunction with attached drawings.

DETAILED DESCRIPTION OF THE PREFERRED EMBODIMENTS

Figure 1:
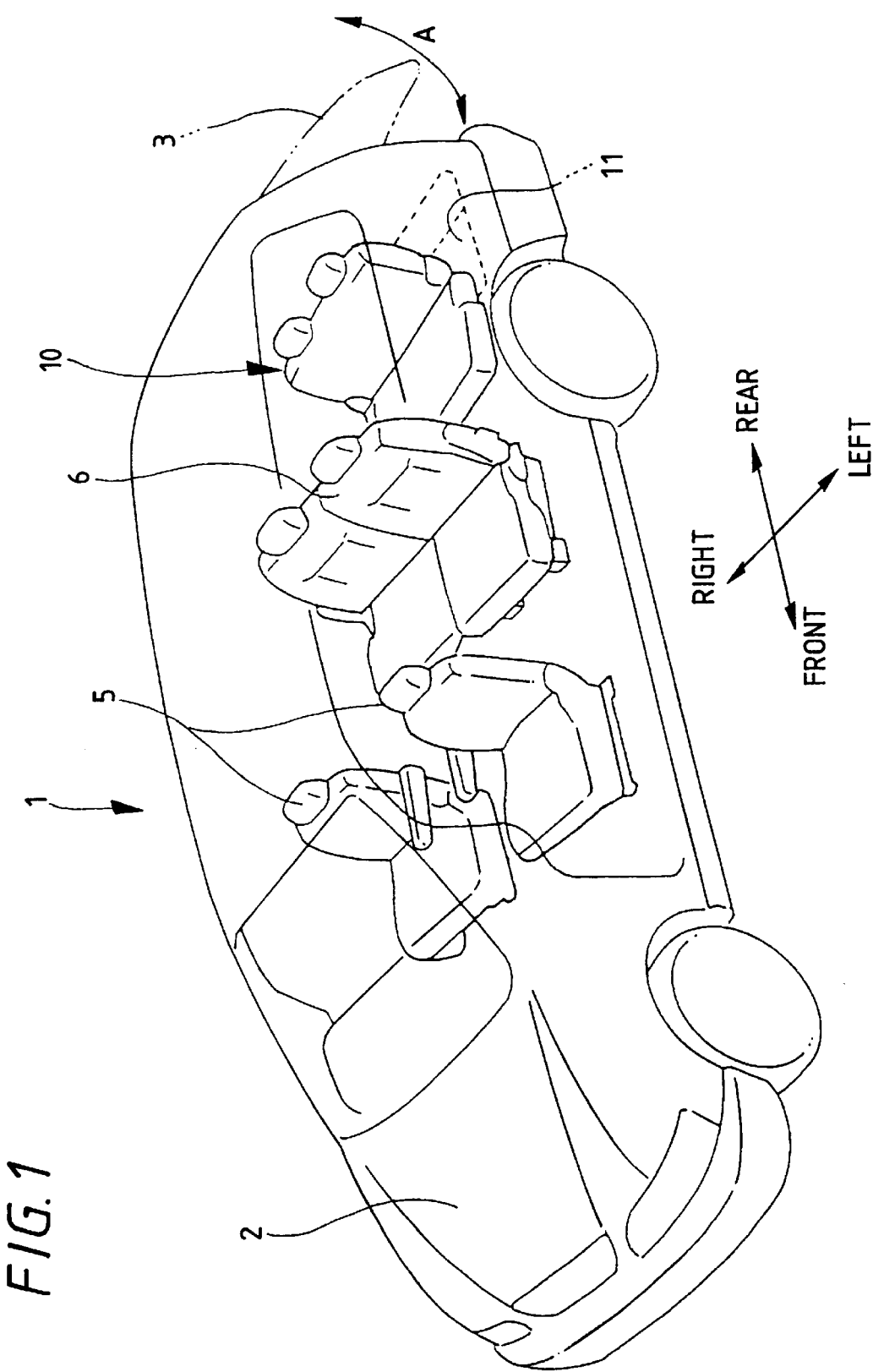
FIG. 1 is a perspective view of a passenger car according to the present invention.

Embodiments of the present invention are described below with reference to the accompanying drawings. The drawings should be viewed in the directions of reference numerals. In addition, the front, the rear, the right, and the left are defined as the directions viewed from the driver.

FIG. 1 is a perspective view of a passenger car according to the present invention. A passenger car 1 has a bonnet 2 at the front; a tail gate 3 at the rear; front seats 5, middle seats 6, and a rear seat 10 as a third seat in the cabinet; and a receiving concave portion 11 provided between the rear seat 10 and the tail gate 3.

The tail gate 3 is a rear door which can be opened and closed as shown by the arrow A.

Figure 2:
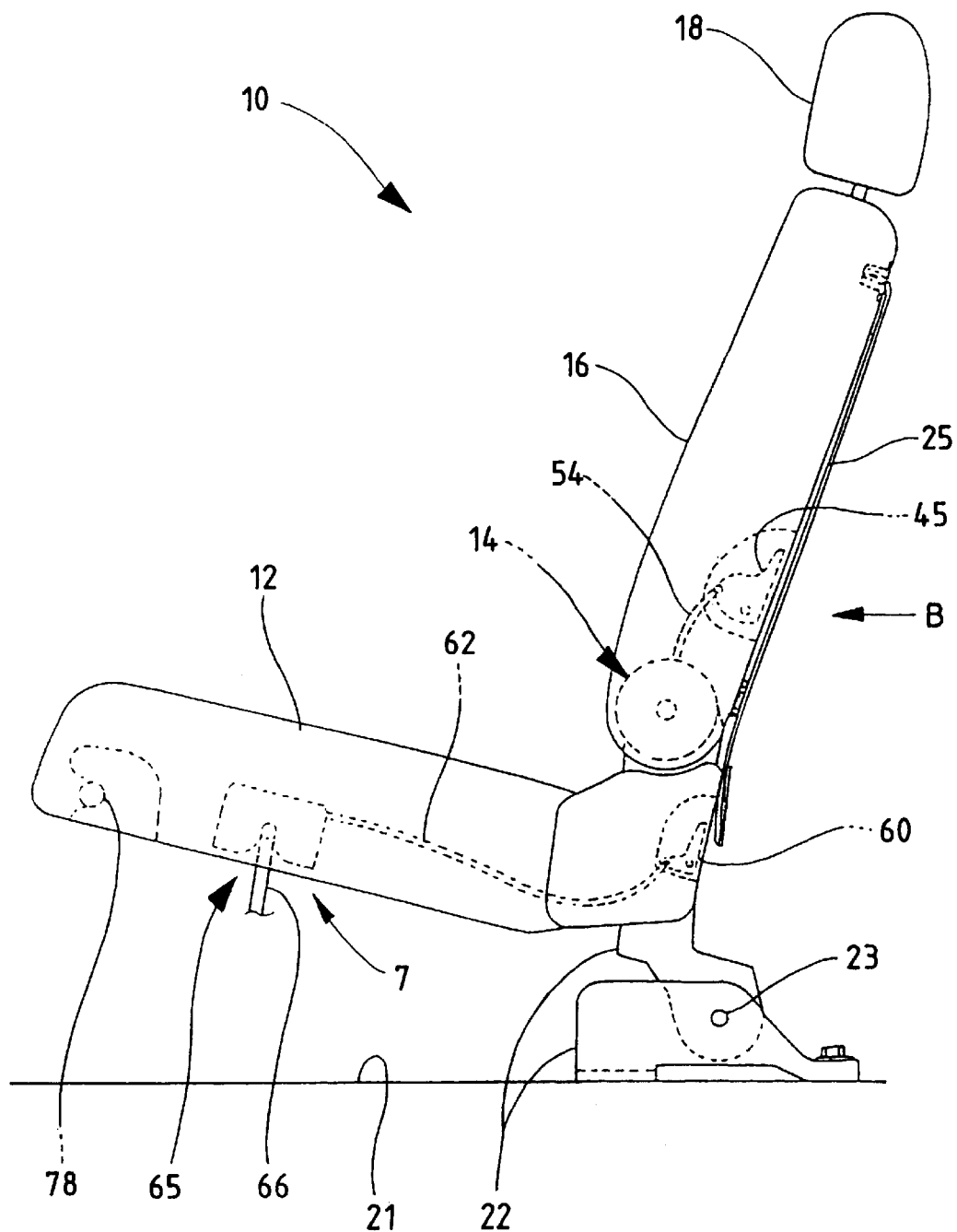
FIG. 2 is a side view of the rear door according to the present invention.

FIG. 2 is a side view of the rear seat 10 according to the present invention. The rear seat 10 is a chair in which a seat back 16 is attached to a seat cushion 12 so that the seat back 16 can be angularly adjusted through reclining mechanisms 14, and a head rest 18 is inserted into the seat back 16 from above. The rear seat 10 is attached to a floor 21 through metal fittings 22 so as to be turnable clockwise, in the drawing, around a pin 23 of the metal seat fittings 22.

The seat cushion 12 is normally locked to the floor 21 by means of seat lock mechanisms 65. The details of the seat lock mechanisms 65 will be described later.

Figure 3:
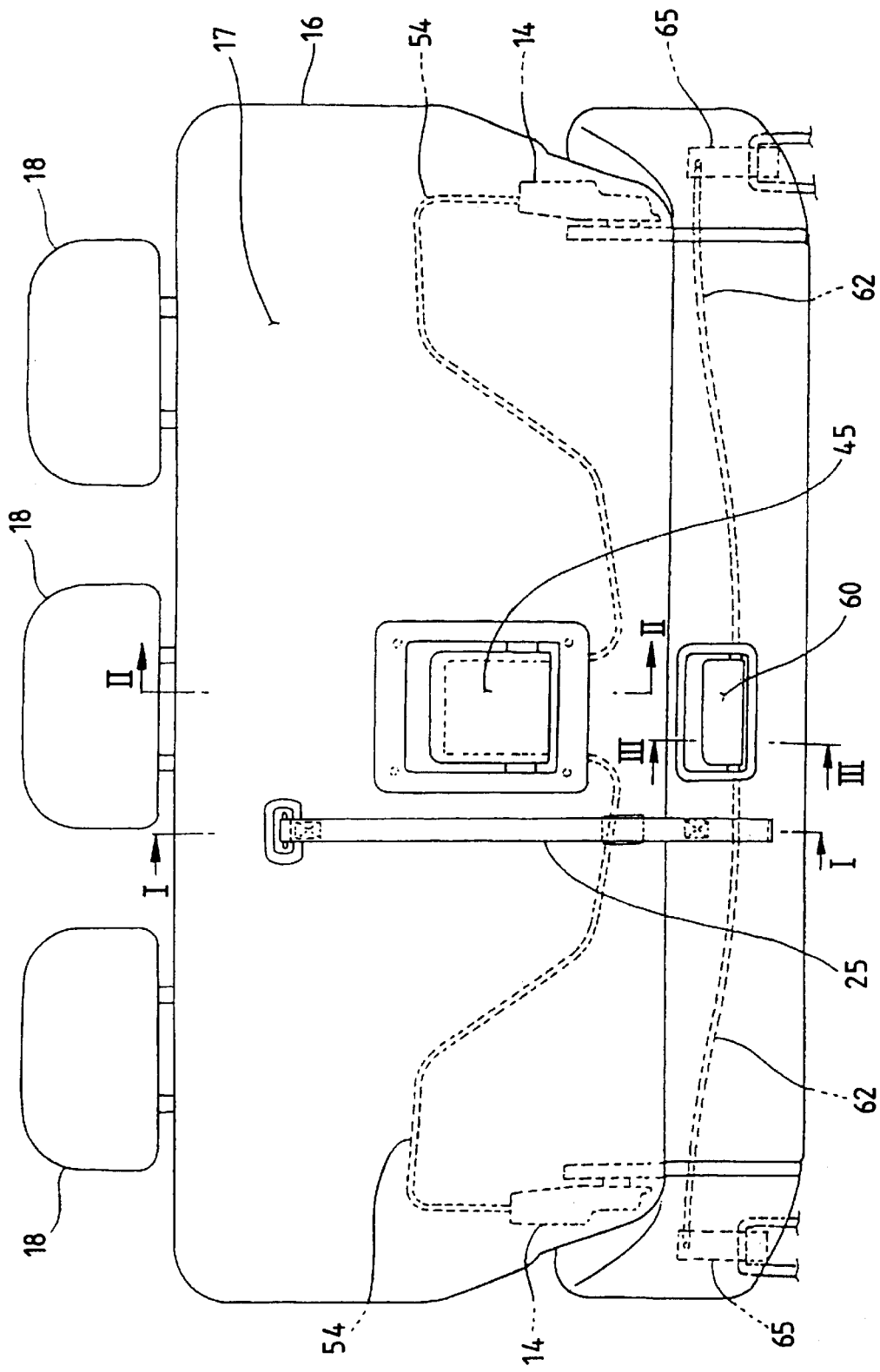
FIG. 3 is a view taken in the direction of the arrow B in FIG. 2, showing the rear seat viewed from the tail gate side.

FIG. 3 is a view taken in the direction of the arrow B in FIG. 2, showing the rear seat viewed from the tail gate side (in the drawing, three head rests 18 are illustrated but no metal seat fittings are illustrated).

As seen in the drawing, a pull fitting 25, a first unlocking lever 45, and a second unlocking lever 60 are provided in the back 17 of the seat back 16 according to the present invention. The first unlocking lever 45 serves a seat back unlocking lever, and the second unlocking lever 60 serves a seat cushion unlocking lever.

Figure 4:
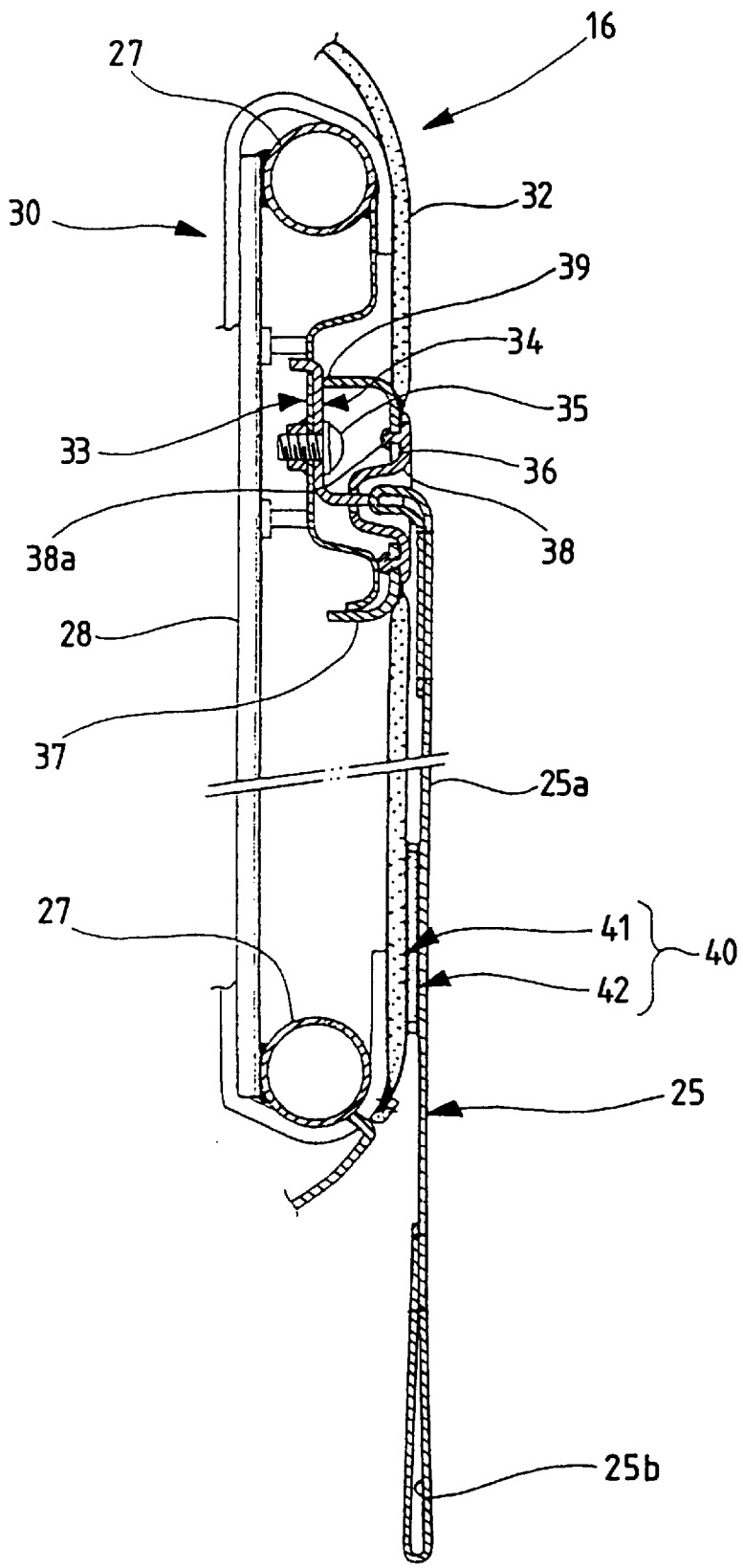
FIG. 4 is a sectional view taken along line I—I in FIG. 3, showing the attachment structure of the pull fitting.

FIG. 4 is a sectional view taken along line I—I in FIG. 3, showing the attachment structure of the pull fitting 25.

Basically, the seat back 16 is configured as follows. That is, a plurality of vertical frames 28 are made to bridge across pipes 27 and 27, and wires (not shown) are put between these vertical frames 28 in the form of lattice to thereby form a skeleton frame 30. A cushion material (not shown) is attached to the skeleton frame 30. The skeleton frame 30 with the cushion material is covered with a skin 32. The structure of the place to which the pull fitting 25 etc. is as follows.

A first bracket 33 is fixed to the skeleton frame 30, and an angle-like second bracket 34 which is attached to the base of the pull fitting 25 is attached to the first bracket 33 by means of a bolt 35.

In addition, the skin 32 is provided with an opening 36, and a receiving member 37 and a garnish 38 are placed against the opening 36 from the back and the front respectively, so that the skin 32 is held by the receiving member 37 and the garnish 38. The base of the pull fitting 25 is made to face the garnish 38 and the receiving member 37 so that a top end 39 of the receiving member 37 is made to abut against the second bracket 34.

The garnish 38 is a kind of decorated lid molded with resin, and designed so that it can be freely attached to and detached from the receiving member 37 by fitting a fall pin 38a into the receiving member 37.

The opening 36 of the skin 32 is required to be reinforced. Accordingly, the opening 36 portion is pressed by the garnish 38 against the receiving member 37. In addition, since the top end 39 of the receiving member 37 is made to abut against the second bracket 34, there is no fear that the garnish 38 and the receiving 37 rattle back and forth (right and left in the drawing).

The pull fitting 25 is a strap constituted by a belt 25a and a pull ring 25b, and a lock member 40 is attached near the pull ring 25b. The lock member 40 is constituted by a receiving piece 41 which is attached to the seat back 16 and a moving piece 42 which is attached to the belt 25a. The receiving member 41 can be coupled with the moving piece 42. A pair of surface fasteners, a pair of permanent magnet and ion strip, a pair of hooks, or the like, may be used as the lock member so that one and the other of the pair are used as the receiving piece 41 and the moving piece 42 respectively.

By the locking function of the lock member 40, the pull fitting 25 can be locked to the back 17 of the seat back 16.

Figure 5:
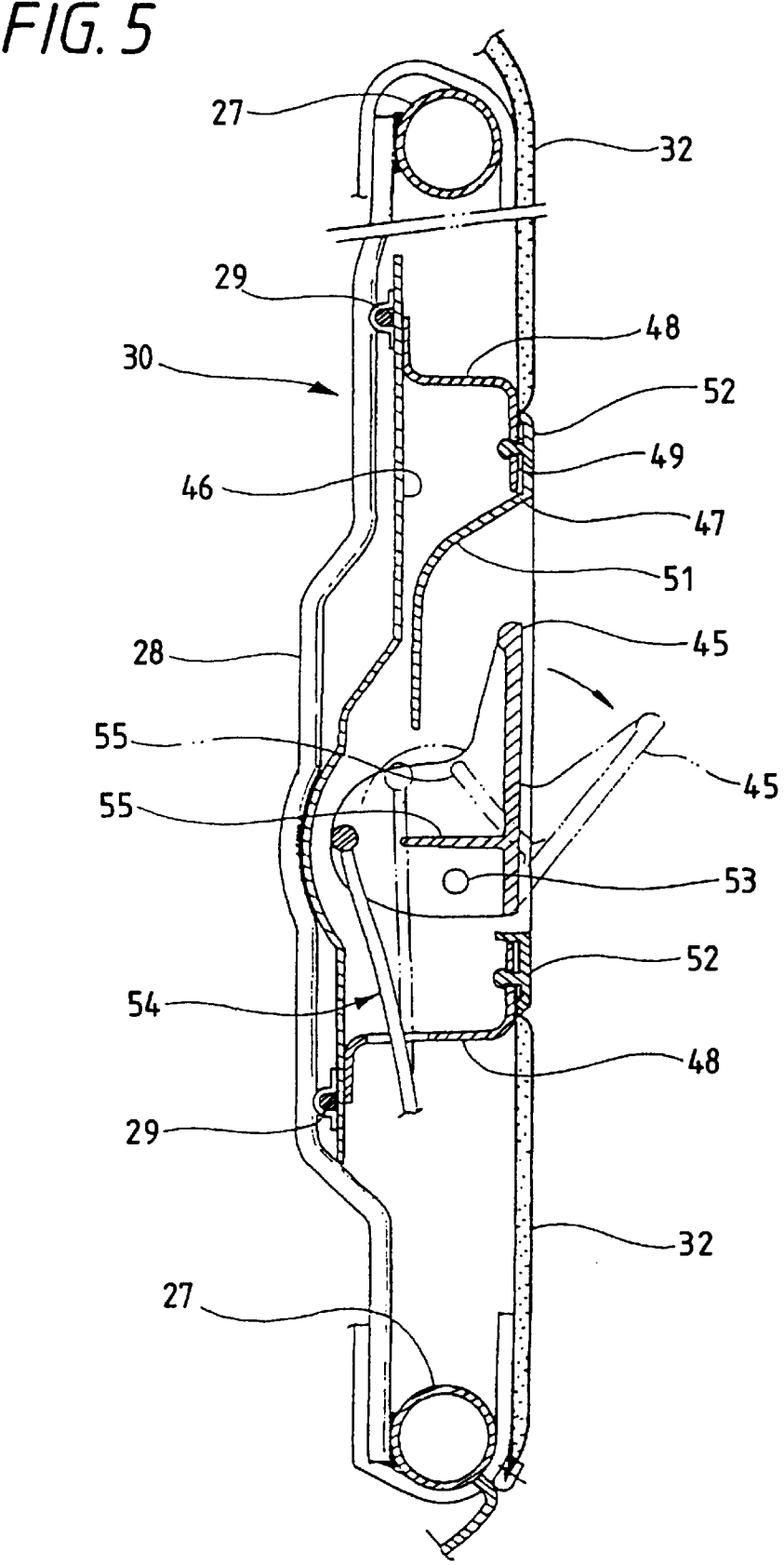
FIG. 5 is a sectional view taken along line II—II in FIG. 3, showing the attachment structure of the first unlocking lever.

FIG. 5 is a sectional view taken along line II—II in FIG. 3, showing the attachment structure of the first unlocking lever 45.

The plurality of vertical frames 28 are made to bridge across the pipes 27 and 27, wires 29 and 29 are put between these vertical frames 28 in the from of lattice to thereby form the skeleton frame 30. A third bracket 46 which supports the first unlocking lever 45 swingably is fixed to the skeleton frame 30. A receiving member 48 with an opening 47 is extended from the third bracket 46 to the vicinity of the skin 32 so that the opening 47 is made coincident with an opening 49 of the skin 32. A garnish 51 is inserted into the opening 47 of the receiving member 48 so as to press the opening 49 of the skin 32. Thus, the skin 32 is held between a flange 52 and the receiving member 48.

If the first unlocking lever 45 is turned clockwise around a pin 53 to a position shown by an imaginary line, an unlocking wire 54 can be pulled up. This makes it possible to unlock the reclining mechanisms 14 shown in FIG. 2.

When the first unlocking lever 45 is opened as shown by the imaginary line, the inside of the seat cushion is exposed. A decorative plate 55 is therefore provided to prevent the exposure of the inside of the seat cushion.

Figure 6A:
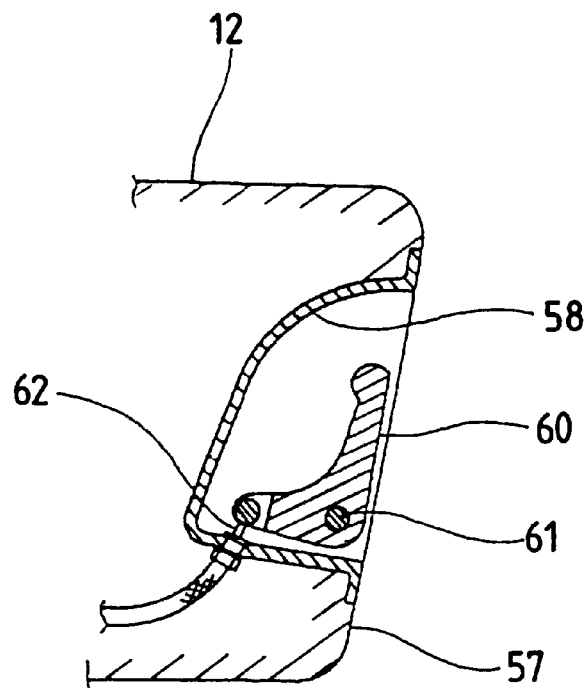
FIGS. 6A and 6B are sectional views taken along line III—III in FIG. 3.
Figure 6B:
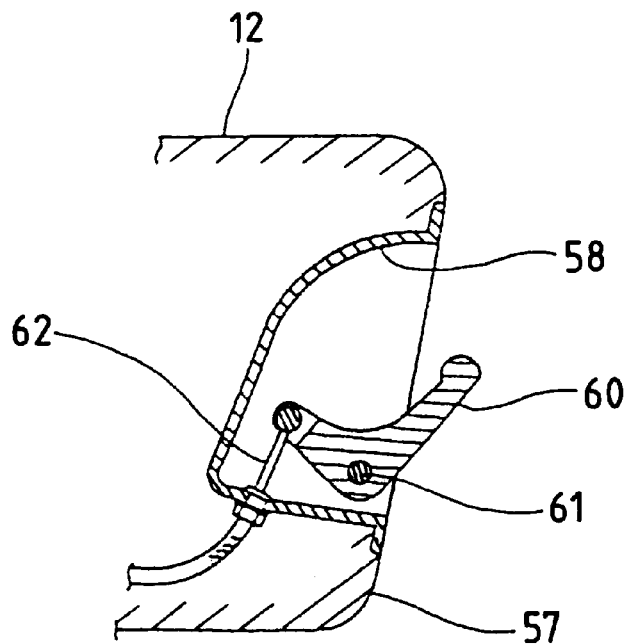

FIGS. 6A and 6B are sectional views taken along line III—III in FIG. 3, showing the attachment structure of the second unlocking lever 60.

FIG. 6A shows that a concave portion 58 is provided in the rear 57 of the seat cushion 12 and the second unlocking lever 60 has been received in the concave portion 58.

In FIG. 6B, if a second unlocking lever 60 is manually turned around a pin 61, an unlocking wire 62 can be pulled up. The seat unlocking mechanism 65 to be unlocked on this occasion will be described below in detail.

Figure 7A:
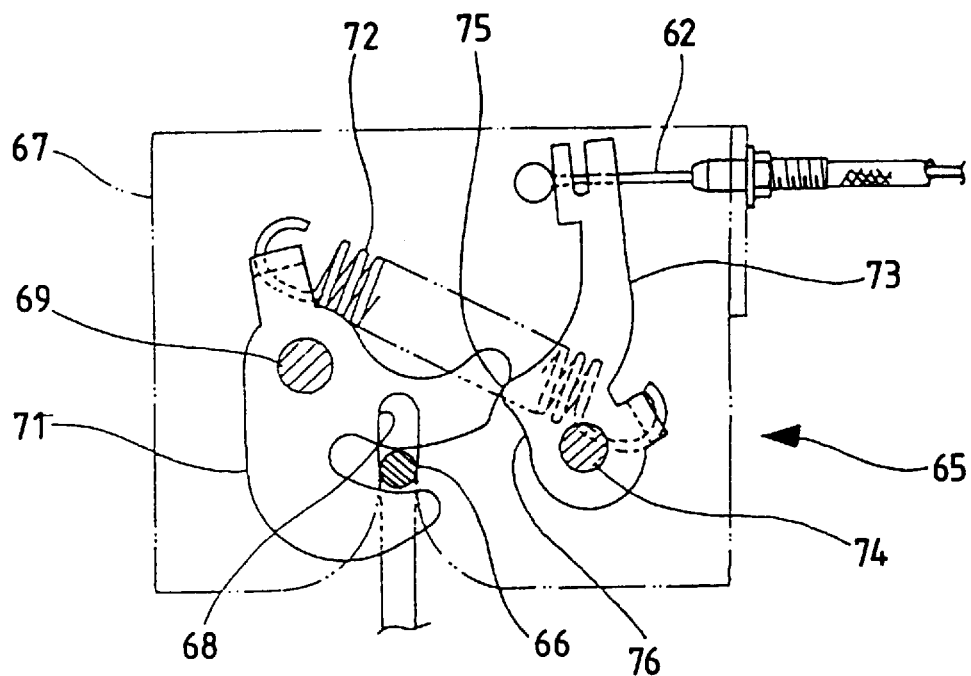
FIGS. 7A and 7B are detailed views of a portion 7 shown in FIG. 2 for explaining the seat lock mechanism.
Figure 7B:
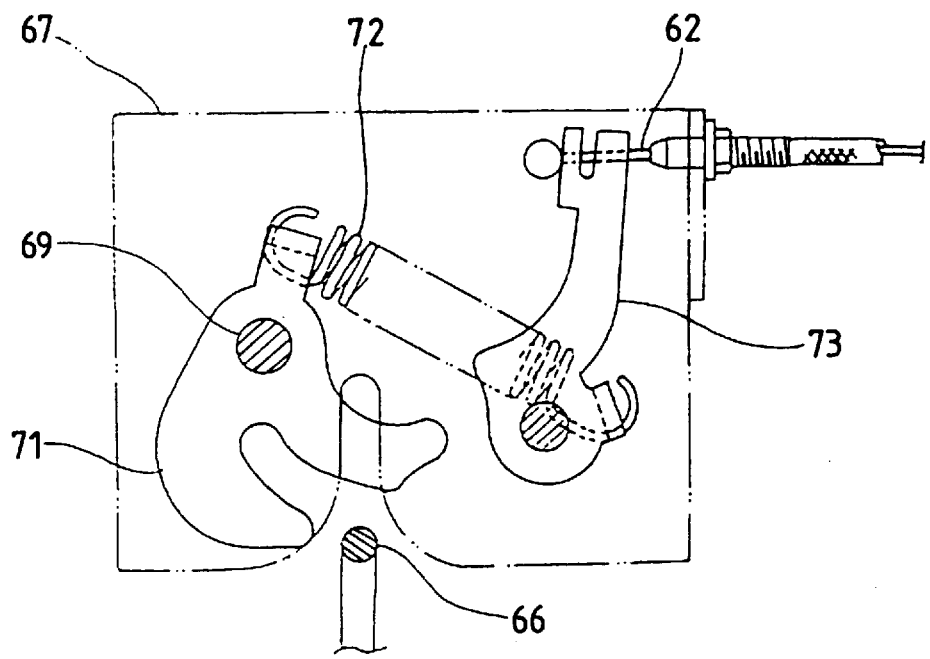

FIGS. 7A and 7B are detailed drawings of a portion 7 shown in FIG. 2 for explaining the seat lock mechanism.

Referring to FIG. 7A, the seat lock mechanism 65 is constituted by a U-shaped metal fitting 66 attached to the floor, a bracket 67 attached to the seat cushion, a U-shaped groove 68 formed in the bracket 67, a lock claw 71 which can be turned around a pin 69 so as to enter and leave the U-shaped groove 68, a spring 72 which urges the lock claw 71 in the unlocking direction (clockwise), a retaining claw 73 which keeps the lock claw 71 in the locking position, and the unlocking wire 62 which makes the retaining claw 73 turn around a pin 74.

FIG. 7A shows the seat locked state in which the U-shaped metal fitting 66 has entered the U-shaped groove 68 so as to be positioned by the lock claw 71. Before the rear seat is received, that is, normally, the rear seat is in this state so that there is no fear that the rear seat rattles.

When the unlocking wire 62 is pulled for unlocking purposes, the retaining claw 73 begins to rotate clockwise. When the retaining claw 73 has rotated to some extent, the portion where the retaining claw 73 comes into contact with the lock claw 71 moves from a convex portion 75 to a concave portion 76. The lock claw 71 cannot be locked in the concave portion 76, that is, the lock claw 71 slides in the concave portion 76 and the lock claw 71 is rotated clockwise by the pulling function of the spring 72.

FIG. 7B shows the unlocked state. This means that the seat cushion has become separated from the floor.

The function of the thus configured seat receiving structure is described with reference to FIGS. 8 and 9. The following operations are performed from the outside of the car under the condition that the tail gate is opened.

Figure 8A:
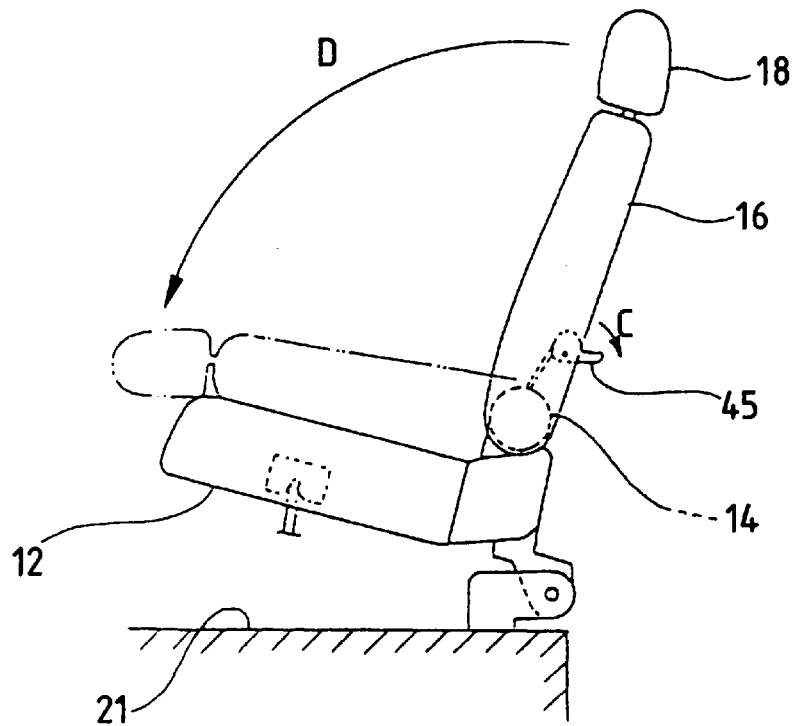
FIGS. 8A and 8B are explanatory views for the function of the rear seat according to the present invention (first half)
Figure 8B:
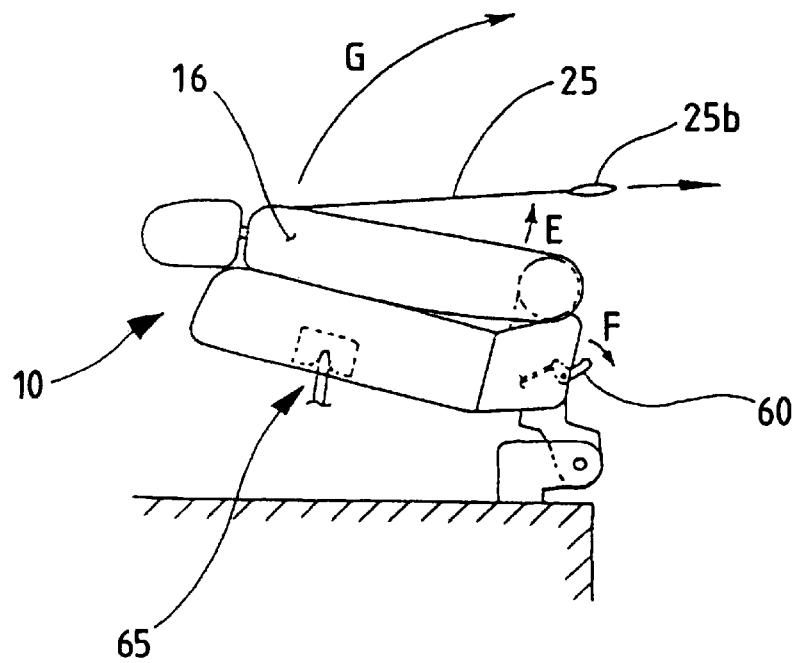

FIGS. 8A and 8B are explanatory drawings for the function of the rear seat according to the present invention (first half).

Referring to FIG. 8A, the first unlocking lever 45 is fallen down as shown by the arrow C. This operation makes the reclining mechanism 14 unlock. The seat back 16 is then fallen down forward as shown by the arrow D and placed on the seat cushion 12. Then, if the hand is put off from the first unlocking lever 45, the reclining mechanism 14 is returned to the locked state. Thereafter, it becomes possible to handle the seat cushion 12 and the seat back 16 integrally with each other.

In FIG. 8B, the pull ring 25b is separated from the seat back 16 as shown by the arrow E to facilitate pulling of the pull ring 25b. The second unlocking lever 60 is then fallen down as shown by the arrow F while the pull ring 25b is pulled to the outside of the car so that the seat lock mechanism 65 is unlocked. Now, the whole of the rear seat 10 is rotated as shown by the arrow G.

Figure 9A:
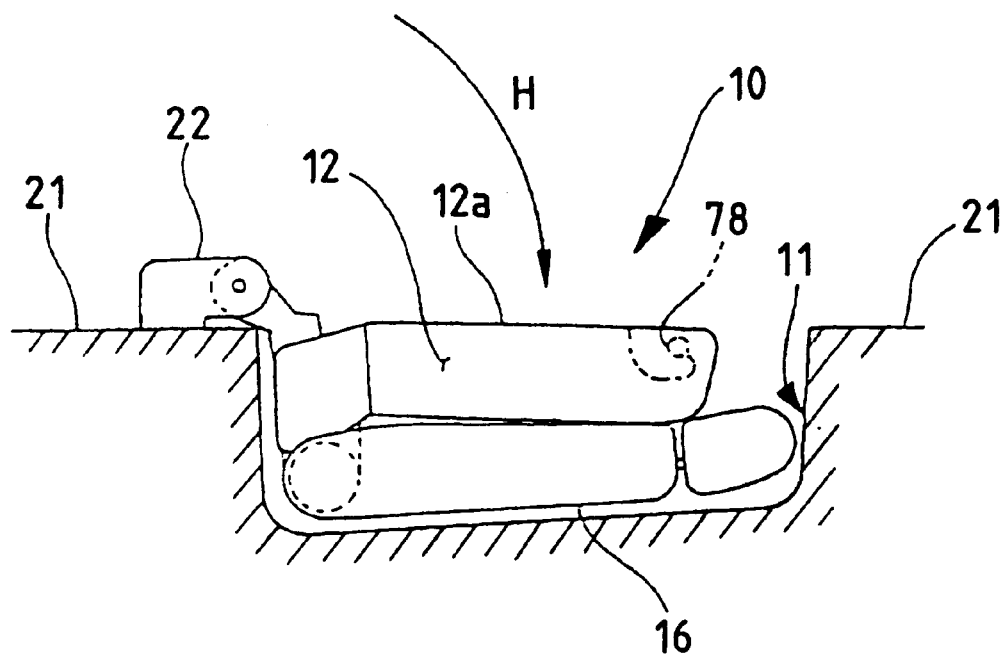
FIGS. 9A and 9B are views for explaining the function of the rear seat according to the present invention (second half)
Figure 9B:
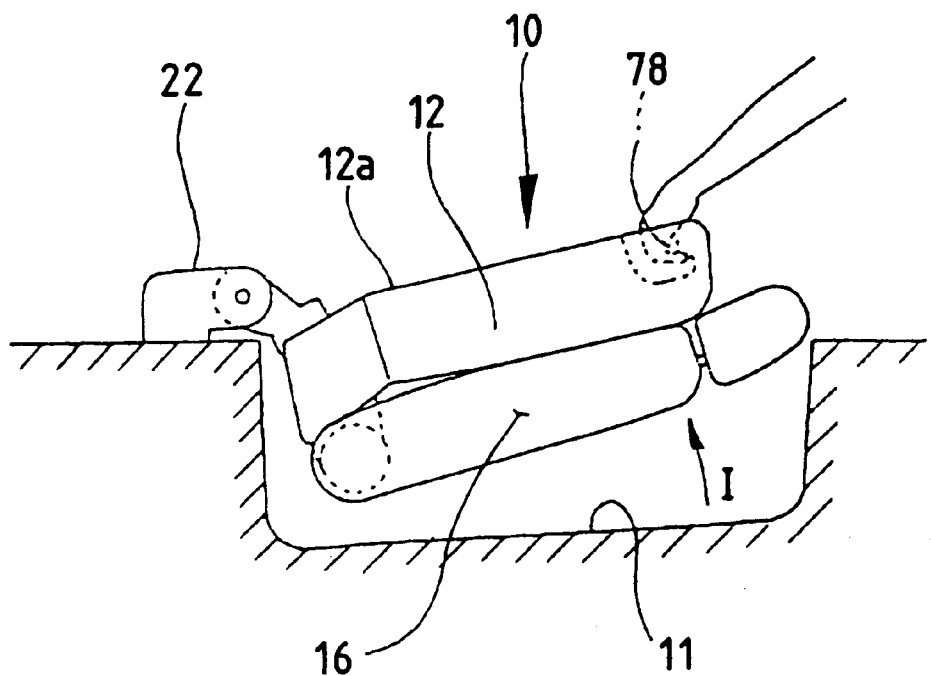
Figure 10:
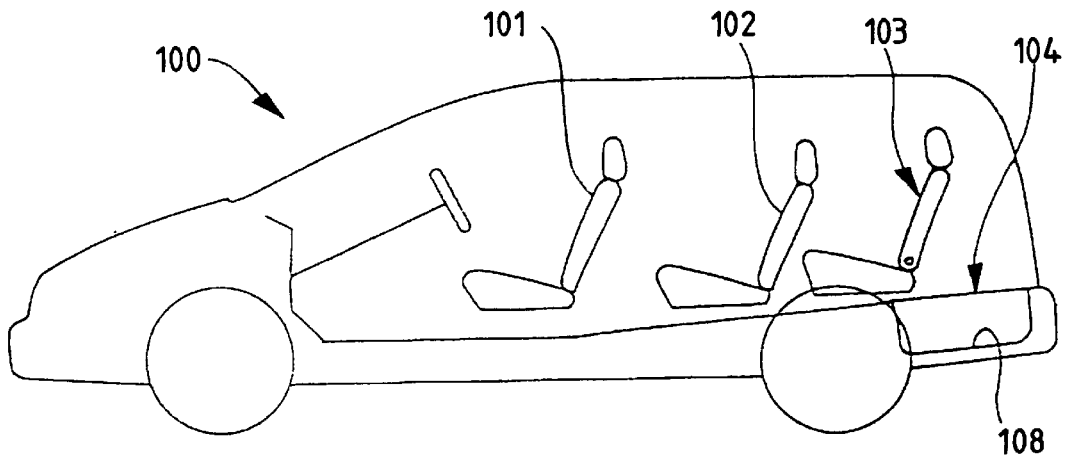
FIG. 10 is a view showing a related-art seat arrangement of a passenger car.
Figure 11A:
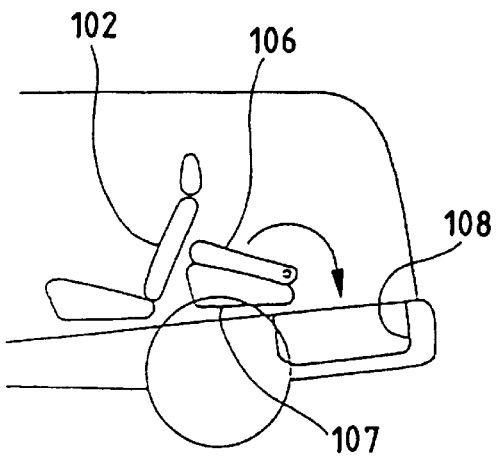
FIGS. 11A and 11B are views for explaining the case where a related-art rear seat is received.
Figure 11B:
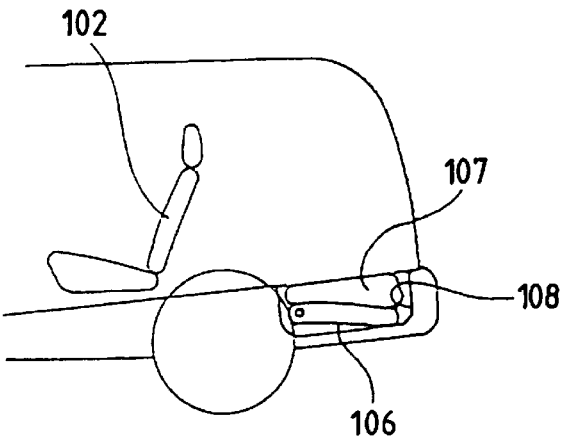

FIGS. 9A and 9B are drawings for explaining the function of the rear seat according to the present invention (second half).

In FIG. 9A, the rear seat 10 is further rotated as shown by the arrow H so as to be received in the receiving concave portion 11. The rear seat 10 is received so that the bottom 12a of the seat cushion 12 becomes substantially even with the floor 21. Thus, the storage of the rear seat 10 in the floor 21 is completed.

On the other hand, in FIG. 9B, to return the rear seat 10 to the original position, one may put his/her hand on a pull handle 78 formed on the bottom 12a of the seat cushion 12 and lift the pull handle 78 to an extent as shown by the arrow I. Then, the rear seat 10 can be turned forward as a whole. Thereafter, if one returns the seat cushion 12 to its substantially horizontal position and erect the seat back 14, the rear seat 10 is returned to its initial posture.

In addition, the first unlocking lever and the seat cushion unlocking lever may be designed so as to be operated from the tail gate side or operated within the room.

The present invention fulfills the following effects by the aforementioned configuration.

An operator opens the tail gate, and stretches his/her arm through the tail gate to make the seat back fall down forward. Then, the operator pulls the pull fitting to make both the seat back and the seat cushion turn over backward so as to be received in the storage concave portion. Accordingly, this design allows an operator to perform the rear seat rearrangement in a very easy posture from the outside of a car.

The pull fitting is fastened to the back of the seat back. This makes it possible to prevent the swinging of the pull fitting, etc.

Since the skin is held between the receiving member and the garnish, the opening of the skin can be prevented from being deformed. In addition, since the receiving member is made to abut against the second bracket, the receiving member prevented from displacing laterally and the receiving member and the garnish are prevented from rattling.

Further, since the first unlocking lever is provided in the back of the seat back, the reclining mechanism can be unlocked from the tail gate side. Therefore, by the operations of the first unlocking lever together with the pull fitting, the rear seat rearrangement can be performed easily from the outside of the car.

Further, since the skin is held between the receiving member and the garnish, the opening of the skin can be prevented from being deformed. In addition, since the third bracket supporting the first unlocking lever is fixed to the skeleton frame, a large force can be applied to the first unlocking lever.

Still further, since the second unlocking lever is provided in a rear portion of the seat cushion, the seat locking mechanism can be unlocked from the tail gate side. Therefore, by the operations of the first unlocking lever together with the pull fitting, the rear seat rearrangement can be performed easily from the outside of the car.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. A passenger car seat storage structure in which a tail gate is provided in a rear portion thereof and a rear seat having a seat cushion and a seat back is disposed adjacent to the tail gate, said seat storage structure comprising:
 a storage concave portion formed in a floor of the car and behind the rear seat, wherein the seat back is folded onto the seat cushion, the rear seat is rotated backward and received in said storage concave portion to make a bottom of the seat cushion substantially even with the floor;
 a pull fitting attached to and extending rearwardly from a back of the seat back for pulling the rear seat backward while the seat back is folded onto the seat cushion side, thereby moving the rear seat to be stored in said storage concave portion; and a lock member for locking said pull fining not in use, said lock member being provided in the back of the seat back;

wherein a first bracket is fixed to a skeleton frame provided in the seat back, a second bracket attached to a base of said pull fining is attached to the first bracket, a skin of the back seat is held between a receiving member and a garnish in a manner so that the receiving member and the garnish are put on the skin from a back and a front of the skin to cover an opening formed in the skin, a base of said pull fitting is disposed to face the garnish and the receiving member, and the receiving member is made to abut against the second bracket.

2. A passenger car seat storage structure according to claim 1, further comprising a second unlocking lever for unlocking a seat lock mechanism which locks the seat cushion to the floor, said second unlocking member being provided in a rear portion of the seat cushion.

3. A passenger car seat storage structure according to claim 1, wherein said pull fitting is a rope.

4. A passenger car seat storage structure according to claim 1, wherein said pull fitting can be accessed through the tailgate.

5. A passenger car seat storage structure according to claim 1, wherein said pull fitting is made of a flexible material.

6. A passenger car seat storage structure according to claim 1, wherein said pull fitting has a pull ring.

7. A passenger car seat storage structure according to claim 1, wherein said pull fitting has a handle.

8. A passenger car seat storage structure in which a tail gate is provided in a rear portion thereof and a rear seat having a seat cushion and a seat back is disposed adjacent to the tail gate, said seat storage structure comprising:

a storage concave portion formed in a floor of the car and behind the rear seat, wherein the seat back is folded onto the seat cushion, the rear seat is rotated backward and received in said storage concave portion to make a bottom of the seat cushion substantially even with the floor;

a pull fitting attached to and extending rearwardly from a back of the seat back for pulling the rear seat backward while the seat back is folded onto the seat cushion side, thereby moving the rear seat to be stored in said storage concave portion; and a first unlocking lever for unlocking a reclining mechanism of the rear seat, said first unlocking lever being provided on the back of the seat back;

wherein a third bracket for swingably supporting said first unlocking lever is fixed to a skeleton frame provided in the seat back, a receiving member having an opening is extended from the third bracket to a vicinity of a skin of the seat back so that the opening of the receiving member is made coincident with an opening formed in the skin, and a garnish is inserted in the opening of the receiving member so as to press the opening of the skin so that the skin is held between the garnish and the receiving member.

9. A passenger car seat storage structure according to claim 8, further comprising a second unlocking lever for unlocking a seat lock mechanism which locks the seat cushion to the floor, said second unlocking lever being provided in a rear portion of the seat cushion.

10. A passenger car seat storage structure according to claim 8, wherein said pull fitting is a rope.

11. A passenger car seat storage structure according to claim 8, wherein said pull fitting can be accessed through the tailgate.

12. A passenger car seat storage structure according to claim 8, wherein said pull fitting is made of a flexible material.

13. A passenger car seat storage structure according to claim 8, wherein said pull fitting has a pull ring.

14. A passenger car seat storage structure according to claim 8, wherein said pull fitting has a handle.

15. A seat storage structure for a passenger car, in which a tail gate is provided in a rear portion thereof and a rear seat having a seat cushion and a seat back is disposed adjacent to the tail gate, said seat storage structure comprising:

a storage concave portion formed in a floor of the car and behind the rear seat, wherein the seat back is folded onto the seat cushion, the rear seat is rotated backward and received in said storage concave portion to make a bottom of the seat cushion substantially even with the floor;

a pull fitting being provided in a back of the seat back for pulling the rear seat backward while the seat back is folded onto the seat cushion side, thereby receiving the rear seat in said storage concave portion;

a lock member for locking said pull fitting not in use, said lock member being provided in the back of the seat back;

a first bracket fixed to a skeleton frame provided in the seat back;

a second bracket attached to a base of said pull fitting and attached to the first bracket;

a skin of the back seat held between a receiving member and a garnish in a manner so that the receiving member and the garnish are put on the skin from a back and a front of the skin to cover an opening formed in the skin; and a base of said pull fitting disposed to face the garnish and the receiving member, the receiving member abutting against the second bracket.

16. A seat storage structure for a passenger car, in which a tail gate is provided in a rear portion thereof and a rear seat having a seat cushion and a seat back is disposed adjacent to the tail gate, said seat storage structure comprising:

a storage concave portion formed in a floor of the car and behind the rear seat, wherein the seat back is folded onto the seat cushion, the rear seat is rotated backward and received in said storage concave portion to make a bottom of the seat cushion substantially even with the floor;

a pull fitting being provided in a back of the seat back for pulling the rear seat backward while the seat back is folded onto the seat cushion side, thereby receiving the rear seat in said storage concave portion;

a first unlocking lever for unlocking a reclining mechanism of the rear seat, said first unlocking member being provided on the back of the seat back;

a third bracket for swingably supporting said first unlocking lever fixed to a skeleton frame provided in the seat back;

a receiving member having an opening extending from the third bracket to a vicinity of a skin of the seat back so that the opening of the receiving member is made coincident with an opening formed in the skin; and a garnish inserted in the opening of the receiving member so as to press the opening of the skin so that the skin is held between the garnish and the receiving member.

* * * * *